April 12, 1938.  W. J. MILLER ET AL  2,114,254
APPARATUS FOR MANUFACTURING POTTERY WARE
Filed Oct. 17, 1935
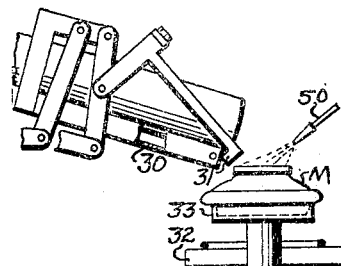
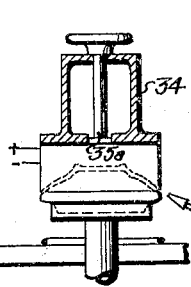
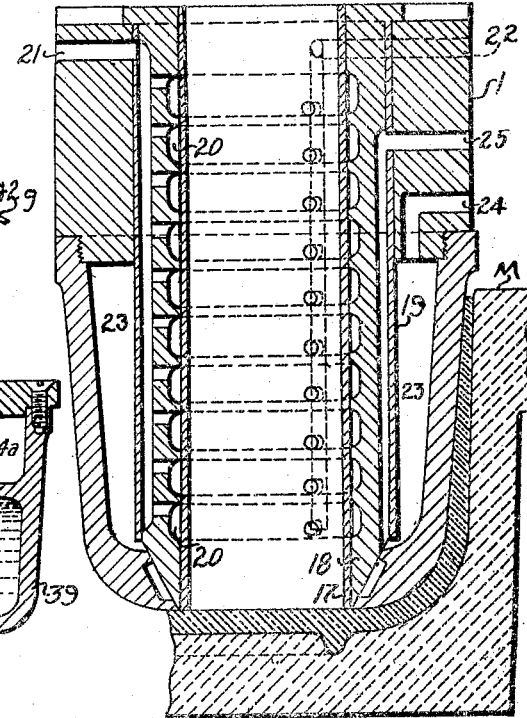
Fig. 1  Fig. 3
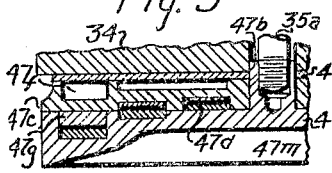
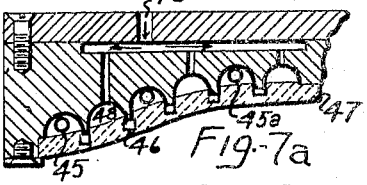
Fig. 5  Fig. 6
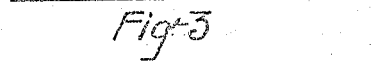
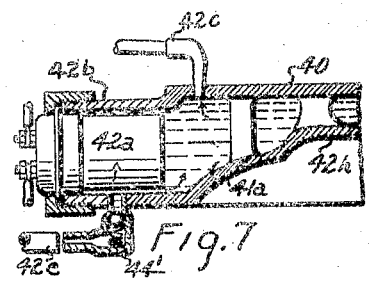
Fig. 7a  Fig. 7
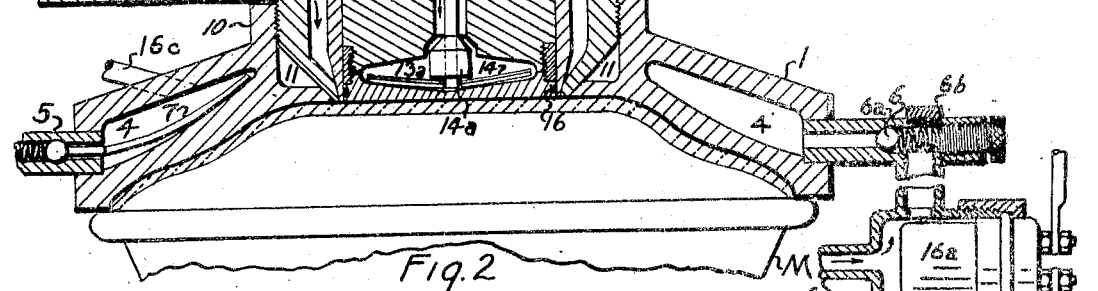
Fig. 2
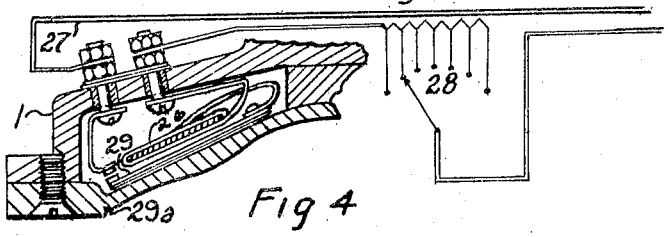
Fig. 4
INVENTORS
William J. Miller
Ashley Reek
BY George J. Croninger
ATTORNEY Patented Apr. 12, 1938

2,114,254

UNITED STATES PATENT OFFICE 2,114,254

APPARATUS FOR MANUFACTURING POTTERY WARE

William J. Miller, Swissvale, and Ashley Reek, Carrick, Pa.; said Reek assignor, by mesne assignments, to said Miller Application October 17, 1935, Serial No. 45,446

25 Claims. (Cl. 25—22)

Our invention relates to apparatus for the manufacture of potteryware, particularly that class of ware known as "dinnerware" such as cups, saucers, plates, etc. fabricated from plastic whitewares clay and heretofore produced by manual jiggering on the potters wheel.

This application is a continuation in part as to all divisible subject matter of the patent to William J. Miller, No. 2,046,525.

Our invention has to do with new or improved clay forming attachments known as "die assemblies" and instrumentalities relative thereto for use in the manufacture of potteryware, said attachments being preferably for use in connection with or on automatic potteryware machinery such as that shown and described in the copending application for United States Letters Patent, Serial No. 715,924 to William J. Miller of which this application is a continuation in part as to all divisible subject matter. As distinguished from decorating and reshaping attachments, the novel and/or improved die assemblies herein are preferably utilized in the making of the bat or blank which is applied to an absorbent mold on which it is completed and on which it dries.

In automatic machine practice it is critical that a firm bond be established between the mold and clay lest the clay rip under the profile due to the higher speed of mold rotation than in manual practice. The firm bond is established by pressing the clay on the mold but, of equal importance, the bond is preserved through the provision of means for overcoming the forces tending to separate the clay from the mold incident to pressing. In short, the pressing means and clay must separate without impairing the bond previously established between the mold and clay.

In making flatware by hand, the batter out prepares a flat disc of clay with a hand mallet. This disc is known as a bat and is thrown onto the surface of the mold and taken by the jiggerman for shaping and the removal of excess material after which the piece is dried. In making hollow ware by hand, the baller throws a ball of clay into the mold cavity without benefit of batting out and the clay is run up the wall of the molding cavity by the profile tool which tends to stretch and separate the clay. The present invention comprehends the making of hollow ware bats as well as flat ware bats both on or off the mold and the release of the forming instrumentality from the adhesive clay.

Broadly this invention involves the use of fluid in connection with the preservation of the bond between mold and clay and the objects of the invention are to provide forming means for making hollow ware and flat ware bats including means for enabling the release of the forming means from the adhesive clay without lifting or separating the clay from the surface on which it is made such as for instance a mold, and in connection with the means for enabling release of the forming means to provide means for generating or applying fluid; to generate a gaseous separating fluid film such as steam through the controlled use of heat; to provide for the application of a liquid such as oil; to provide for the application of both heat and fluid; and as specifically regards the construction of the attachments, to provide electrically heated applying means for the generation and application of fluid or both, to provide a fluid heated water cooled feeder die assembly; to provide a die for heating and applying liquid such as oil to the clay contacting surface thereof and to provide an electrical heating unit adapted for use with and selective interchange of die bodies.

The various die embodiments shown each comprise a body portion having a forming or clay engaging surface preferably contoured and coextensive with the surface, for instance the ware forming surface of a mold, of the instrumentality on which the clay blank or bat is formed, together with means for releasing the clay engaging surface from the sticky material. The invention comprehends die constructions having means for generating a gaseous or vaporous fluid from body or surface water in or on the clay blank with provisions for controlling the application of heat to prevent harmful drying out of the clay as well as dies arranged to apply a separating fluid film to the zone between the clay and the face of the forming surface.

In the drawing:

Fig. 1 is a small plan view illustrating one type of mechanical potteryware fabricating apparatus on which certain of the die assemblies may be installed.

Fig. 2 is a sectional elevation of a fluid heated plunger feeder flatware die assembly.

Fig. 3 is a sectional elevation of a fluid heated plunger feeder hollow ware die.

Fig. 4 is a fragmentary section of an electrically heated flatware die.

Fig. 5 is a sectional elevation of an electrically heated closed center hollow ware die.

Fig. 6 is a sectional elevation of a close center hollow ware die having a thermal-siphon heating arrangement.

Fig. 7 is a fragmentary section of a flatware die provided with a thermal-siphon heating arrangement.

Fig. 7a is a fragmentary section of a die adapted both for the application of heat and fluid to the surface of the clay.

Fig. 8 is a sectional elevation of a novel form of interchangeable die and grid element.

As described in the co-pending application supra, the contoured clay contacting faces of the die and plunger herein illustrated in Figures 2, 3 and 4 are heated to generate a separating fluid film from the moisture in or on the clay to thus insure retention of the clay on the mold as the die and mold are separated. The degree of heat applied is critical with regard to the depth of drying out of the ware surface and if not accurately regulated will result either in case hardening of the ware surface or the production of deep cracks, the latter requiring an abnormal amount of tooling to remove. In manual practice the piece might be tooled until restored, but in high speed machine practice, only a definite amount of tooling is performed on each and every piece of ware and any abnormal condition of the ware surface such as above, could not be normally corrected.

The clay may also be released by applying oil to the clay contacting face of the pressing means. The oil is preferably heated to facilitate spraying thereon or exudation through the pores of the clay contacting face. A thin film of oil is preferred both in the interests of economy and avoidance of clay contamination.

The open center die assemblies shown in Figs. 2 and 3 are preferably for use in connection with the potteryware fabricating machinery shown in the co-pending application supra and are known as plunger feeder dies wherein the die body 1, Fig. 2, is rigidly attached to the machine frame and the plunger 2 to a reciprocating cross head. Molds M are automatically travelled to, centered and elevated co-incidently with the progress of a clay charge through the bushing 3 and onto the mold. The mold and plunger rise in unison thereafter to press the clay charge between the die and mold and spread, conform, form and adhesively bond it to the ware forming surface of the mold.

The die body is chambered at 4 for the reception of steam or heated fluid. The admission and discharge of fluid is controlled by adjustable check valves 5 and 6 respectively and by proper adjustment of either one or both valves the pressure and temperature conditions therewithin can be regulated to maintain an optimum temperature on the impermeable die face at approximately 212° F. which is a "safe" temperature at which to work the die without producing surface cracks in ordinary potters clay of a depth too great to be removed by tooling. A bimetallic thermostat element 7 located on the floor of the chamber 4 is adapted to automatically control die temperature in by regulating the import of fluid through valve 5.

A nipple 8 with an offset fluid passage 9 is screwed into the central boss 10 of the die and insulated at 11 from the heating chamber 4. The concentric plunger bushing 3 pressed into the nipple has clearance at 12 for the circulation of a cooling fluid discharged at 13. Heated fluid is also circulated in hollow plunger 2, the admission and discharge thereof to chamber 13a being controlled by bimetallic thermostat element 14 responsive to floor temperature. The thermostat actuates a shut-off valve 14a through a rod 15. By cooling the bushing 3, the drying out of any adhering clay is minimized before it is removed by a wiper ring 16 encompassing the plunger head.

The die is preferably connected to the steam line of the plant or factory and, if necessary, the steam may be superheated before admission to the chamber 4 by installing an electric heating element 16a in the line. Where the element is located in the position shown, the position of ball closure 6a of check valve 6 is reversed and the circulation of steam reversed, the valve 5 then controlling the outlet. A removable plug 6b is provided for enabling the relocation of the closure 6a. The check valve 6 could also be left in the position shown and the bimetallic thermostat transposed to control the input automatically.

Where a plant line is not available, the inlet and outlet may be connected in a closed fluid line 6c in which the element 16a is interposed at the lowermost point to insure circulation. The line 6c and die chamber 4 may be filled with oil or glycerine and a relief valve 16c tapped into the chamber 4. Steam may also be generated by tapping a cold water line into the line 6c.

It is understood that these heating provisions are readily applicable to a closed center die.

In the hollow ware die Fig. 3, the long plunger bushing 17 located in insert 18 is encompassed by sleeve 19 and cooled by circulating a fluid in conduits 20 each of which is connected by suitable inlet and outlets to common supply and discharge passages 21 and 22. The clay contacting face of the die is heated by fluid in chamber 23 admitted at 24 and discharged at 25. Temperature and pressure conditions may be regulated by valves such as those disclosed at 5 and 6.

The contoured impermeable clay contacting face of the flatware die of Fig. 4 is heated by an electrical resistance element 26 connected in circuit 27 manually controlled by rheostat 28 and automatically by bimetallic thermostat element 29. The demountable impermeable die face 29a is secured to the body by screws and may be interchanged with those of other face contour enabling the use of the die in making a plurality of different shapes or contour ware.

The closed center die assemblies shown in Figs. 5 to 9 inclusive are preferably for use with a machine of the type shown in Fig. 1. In this machine, the clay is fed in billet form on belt 30 intermittently and in timed relation with the cutting stroke of a severing wire 31 and a charge of clay segregated and gravitated onto the center of a previously elevated mold. The mold is shifted by transfer 32 to centered position over chuck 33 and elevated into engagement with one of the closed center die assemblies just mentioned for spreading the charge over and bonding it to the mold. The dies are interchangeable and are centrally tapped at 35 for demountable attachment to the lintel 34 of the machine on an adjustable stud 35a.

Fig. 5 discloses a hollow ware die 36 having a removable top plate 36a and a relatively thick impermeable body with contoured external clay contacting surface 36b for pressing out cups and bowls. The chambered interior of the die body is provided with a tubular electric resistance element 38 set in vertical position which may be manually or automatically controlled by any of the instrumentalities aforesaid, the element being shielded from contact with the die body by any suitable insulating material.

The hollow ware die assembly 39 of Fig. 6 has a sealed chamber 41 either completely or partly filled with a fluid such as olive oil or glycerine. When the sealed electric resistance element 42 is energized, the rise in temperature of the fluid encompassing the resistance element results in a flow or circulation of the fluid toward the cooler impermeable shell of the die. The chamber 41 in the die 39 is check valved at 44 into the upper chamber 44a to take care of fluid expansion. The temperature of either die is controlled by rheostat and/or thermostat as shown in Figure 4 to establish and maintain an optimum temperature.

The flatware die 40 of Fig. 7 has a fluid chamber 41a and electric resistance element 42a located in an offset boss 42b. This die may be filled with oil or glycerine and operated in the same manner as the die of Fig. 6, a relief valve being interposed in the die shell in place of the pipe 42c. To insure circulation of the fluid, the pipe 42c, leading from the top of a "hot" oil zone of the die, may be connected to the pipe 42e leading into the bottom of the chamber 41a and the position of the ball closure check valve 44' reversed.

This die may also be used in the application of heated fluid such as oil to the clay contacting surface of the die either by spraying or exudation. The oil normally utilized for this purpose does not atomize readily unless heated, neither does it flow through the minute pores of the die face readily unless the surface tension is reduced. Accordingly, if the fluid is to be applied externally through a nozzle such as that at 42g, Fig. 1, the line 42c is connected thereto and the line 42e to a source of oil supply under pressure and the valve 44' removed, reversed or tapped into the casing as a relief valve. The face plate 42h of the die may be overlaid by a liner of felt or other resilient material which will absorb the fluid for subsequent "squeezing out" under the pressure required to apply the clay to the mold and forming a thin separating film. Oil drip onto surface of the ware is prevented by the normal expansion of the material and capillary suction upon release of pressure. Where the die is provided with a porous face plate, it may be overlaid with felt and the fluid exuded thereonto or, due to the minute size of the capillary passages in the porous plate, it may be worked bare without danger of the pores clogging with clay, particularly where the oil is under pressure.

The die body 47a of the attachment of Fig. 8 has a contoured clay contacting surface 47m and a central mounting stem 47b on which is assembled a grid plate 47c with a plurality of concentric ring grids 47d and an insulating cover plate 47e. The attachment may be quickly dissembled and the die body replaced by one having a differently contoured face. All of the parts are held in associated relation by the lintel stud 35a and when mounted thereon the cover 47e lies against the metal lintel and minimizes heat loss, further reduced by the dead air spaces 47f. The ring grids 47d are insulated from the grid plate 47c by resilient packing 47g which tends to press the grid elements firmly against the top surface of the die body 47a. These ring grids are demountable and the grid can be used with smaller diameter die bodies by removing the outer ring grid. The ring grids are electrically connected through suitable contacts to a circuit such as that shown in Fig. 4 and may be manually controlled by rheostat and if desired, a thermostat may be included to control the energization thereof in response to the temperature of the die body.

The die assembly of Fig. 7a has a permeable porous face plate 47 through which fluid such as oil is exuded, the oil being conducted to the face plate through grooves 48 and inlet pipe 49. Electric coils 45 located in alternate grooves 45a sealed with respect to the face plate by rings 46, heat both the face plate and the oil, and the die may be worked with a resilient liner as described in connection with Fig. 7 or simply as a "hot die" according to the teachings regarding Fig. 2. Compressed air may also be discharged through the capillary passages of the die to assist in releasing the clay or as the prime means of releasing in the absence of heat or oil. In such event, all of the passages 45a and 48 are connected by a cross channel and the inlet 49 to a valve to a source of compressed air.

Where the clay is to be released from the die by the vaporization of moisture within the molding chamber, fluid (water) may be externally applied to the charge at the feeding station by an atomizing nozzle 50. It is understood that any one of these dies having provisions for the application of heat to the clay surface may also be utilized in the heat conditioning of the surface whenever required in the various fabricating processes in the manufacture of potteryware.

Where steam is put through a porous die, the precipitant serves to lubricate the surface of the clay for subsequent profiling. The die of Fig. 7a can be worked in this manner as a means of treating the clay with a fluid to prevent drying out of the upper surface of the clay during progress from the press head to the jigger.

The present invention concerns the manufacture of whiteware, tableware, dinnerware, china, porcelain, earthenware, semi-vitreous china bats in the making of ware for household, domestic, restaurant, etc. use. The procedure involved is known as "batting out" and the article which is produced is known as a "bat". Hence, the instrumentalities herein disclosed may be classed generally as "batting out devices" or devices for use in connection with "batting out" apparatus. In regard to the character of the bats made by or with the aforesaid devices, this primarily depends on the manner in which the apparatus is utilized, the contour and finish of the molding surface of the die and the amount of clay used in the charge. Thus, any one of the dies disclosed herein may be used in the manufacture of jiggering bats containing an excess of clay or in forming bats completed and polished in readiness for green drying and corresponding substantially to the completed product as far as plastic forming is concerned.

Where in the appended claims the term "dinnerware" occurs, it shall be construed as covering all of the various classes of ware designed in the preceding paragraph.

Having thus described our invention what we claim is:

1. An attachment for dinnerware fabricating machinery for spreading clay on and applying the same to absorbent molds which comprises, in combination, a body portion having a clay contacting surface, an electric resistance element for heating said surface, and a thermostat for controlling the energization of the electric resistance element.

2. An attachment for dinnerware fabricating machinery for spreading clay on and applying the same to absorbent molds which comprises, in combination, a body portion having an impermeable clay contacting face and a chamber within said body portion, an electric resistance element in said chamber for heating said clay contacting surface, means for manually controlling the energization of said resistance element and means for automatically controlling the energization of the electric resistance element.

3. An attachment for dinnerware fabricating machinery for spreading clay on and applying the same to absorbent molds which comprises, in combination, a body portion having a sealed chamber, a fluid in said chamber, and means for heating said fluid.

4. An attachment for dinnerware fabricating machinery for spreading clay on and applying the same to absorbent molds which comprises, in combination, a body portion having a chamber adapted for the reception of a heated fluid and means operable in response to heat and pressure conditions in said chamber for controlling the admission and discharge of heated and spent fluid.

5. An attachment for dinnerware fabricating machinery for spreading clay on and applying clay to absorbent molds which comprises, in combination, a body portion having an attaching stem and a contoured clay contacting face, a plate mounted on said stem and having a plurality of electrical heating elements associated therewith said attachment being of such a nature that the grid plate and body portion are normally held in associated relation by said attaching stem.

6. In apparatus for producing potteryware, a mold adapted to receive a clay charge, in combination with shaping means for spreading a charge on said mold comprising a body portion having a channel therein through which a charge passes, means for cooling said channel, said body having a second chamber therein for the reception of a heating fluid.

7. In apparatus for fabricating dinnerware, a die comprising a body portion having a clay channel therein, and a plurality of passages encompassing said channel adapted to receive a cooling medium, said die having a clay contacting face, and means for heating said face.

8. In apparatus for the manufacture of potteryware from plastic clay on absorbent molds the combination which comprises, a shaping head having a clay engaging surface and a clay conduit, a clay ejector adapted to reciprocate in said conduit, means for heating the clay engaging surface of said shaping head, means for insulating said conduit from said heating means in the form of a fluid circulating channel encompassing said conduit and means associated with said plunger for removing residual clay from the wall of said conduit.

9. In combination with apparatus for the manufacture of potteryware, a die having a steam heated clay contacting face and a water cooled clay passage.

10. In apparatus for the manufacture of potteryware, the combination of an open center die having a clay contacting face and means for heating the same, and an insulated clay passage together with a reciprocable plunger working in said passage having a clay engaging surface and means for heating the same.

11. In apparatus for the manufacture of potteryware, a die having a fluid chamber therein and a clay engaging surface adjacent said chamber, means for conducting a heated fluid to said chamber, auxiliary means in said line for heating the fluid prior to admission to said chamber and means for controlling the admission of fluid to and the discharge of fluid from said chamber.

12. In apparatus for the manufacture of potteryware, a die having a fluid chamber therein, a fluid line communicating with said chamber and forming together with said chamber, a fluid circulating system normally closed to atmosphere, heating means interposed at the lowermost point of said line and a relief valve in said line.

13. In apparatus for the manufacture of potteryware, the combination with a support of a closed center die having a chambered interior provided with an electric resistance element, a demountable top plate and attaching means for mounting said die on said support.

14. In apparatus for the manufacture of potteryware, a die having a chamber therein for the reception of a fluid and a clay contacting face, means for heating said fluid to thereby heat said clay contacting face, a fluid jet, a fluid line communicating with said chamber and said jet and a pressure line communicating with said fluid chamber for supplying fluid thereto.

15. In apparatus for the manufacture of potteryware, the combination with a support of a die construction for making clay bats which comprises a grid plate having a plurality of electric resistance elements associated therewith, an interchangeable face plate and means associated with said face plate for attaching said construction to the support and means for insulating said die body relative to said support.

16. In apparatus for the manufacture of potteryware, a die construction comprising a body portion having alternate passages one adapted for the reception of a fluid and the other for the reception of heating elements and a permeable face plate through which the fluid may exude.

17. A bat forming die comprising, in combination, a body portion having a wall of substantial thickness, a heating element disposed in the cavity of the die portion in abutting relation with the internal wall surface of the die body, a plate attached to the top of said die body, said plate having conduits therein for receiving electrical connections leading to said heating element, said body portion having a clay contacting and spreading surface separable from the clay by virtue of the heat generated by the heating element.

18. In combination with apparatus for the manufacture of potteryware, an open center die having a chamber therein for the reception of a heating means and a conduit for the passage of moist clay insulated relative to said chamber.

19. In apparatus for the manufacture of potteryware, a bat forming member which comprises a body portion having a steam chamber therein and means for controlling the admission of steam to said chamber, said body portion having a clay contacting surface heated by the steam chamber to render said surface non-adhesive to the clay.

20. In apparatus for the manufacture of potteryware, a bat forming member comprising a body portion having a steam chamber therein, means for conducting steam to said chamber and means for controlling the discharge of steam from said chamber, said body portion having a clay contacting surface adapted to transmit heat to the clay in rendering the said surface substantially non-adhesive.

21. In apparatus for the manufacture of potteryware, a bat forming member comprising a body portion having a chambered interior and an external clay contacting surface, an electric resistance element located in said chamber for the purpose of heating said surface, means for attaching said body to a support, a portion of said body being separable from the remainder for the purpose of obtaining access to said heating element.

22. In apparatus for the manufacture of potteryware, a bat forming member comprising a body portion having a chambered interior which is filled with liquid and a heating means immersed in said fluid.

23. In apparatus for the manufacture of potteryware, a bat forming member comprising a body portion having a demountable face which forms together with the remainder of the body portion, a chamber in which is located an electric resistance element, means for energizing said resistance element to thereby heat the face and means for controlling the energization of said heating element.

24. In apparatus for the manufacture of potteryware, a die for batting out clay which comprises a pressing plate, a member having a plurality of electric resistance elements associated therewith and adapted to be mounted on the back of said pressing plate, and means for insulating said die from an attaching surface, said electric resistance element being adapted to heat said pressing plate to render it substantially non-adhesive.

25. In apparatus for the manufacture of potteryware, a die for batting out clay which comprises a plurality of sections one of which comprises a pressing plate and the other of which includes heating means and a support therefor adapted to be clamped in associated relation with said pressing plate, said pressing plate being interchangeable with a plurality of other pressing plates to thereby enable the use of the die and the making of a plurality of different sizes of bats.

WILLIAM J. MILLER.
ASHLEY REEK.